United States Patent
Saxton

(12) 
(10) Patent No.: US 9,108,275 B2
(45) Date of Patent: Aug. 18, 2015

(54) BI-MATERIAL STRIP AND A METHOD OF BONDING STRIPS OF DIFFERENT MATERIALS TOGETHER

(71) Applicant: Federal-Mogul Corporation, Southfield, MI (US)

(72) Inventor: David Michael Saxton, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 14/050,501

(22) Filed: Oct. 10, 2013

(65) Prior Publication Data

US 2014/0099514 A1   Apr. 10, 2014

Related U.S. Application Data

(60) Provisional application No. 61/712,016, filed on Oct. 10, 2012.

(51) Int. Cl.
  *B23K 31/00* (2006.01)
  *B23K 35/24* (2006.01)
  (Continued)

(52) U.S. Cl.
  CPC . *B23K 35/24* (2013.01); *B21B 1/38* (2013.01);
  *B22F 3/18* (2013.01); *B22F 7/04* (2013.01);
  *B23K 1/0008* (2013.01); *B23K 1/19* (2013.01);
  *B23K 20/04* (2013.01);
  (Continued)

(58) Field of Classification Search
  CPC ...... B22F 1/0059; B22F 2998/10; B22F 9/24;
  B22F 2202/01; B22F 7/04; B23K 20/2275;
  B23K 1/002; B23K 35/025; B23K 35/262;
  B23K 35/34; B23K 35/36; B23K 35/3618
  USPC .............. 228/136, 220, 254, 158, 206, 235.3,
  228/262.43; 428/652, 940, 566, 567, 673,
  428/677, 926, 935, 554, 653, 654, 675, 939
  See application file for complete search history.

(56) References Cited

U.S. PATENT DOCUMENTS 2,490,549 A    12/1949  Schultz et al.
2,539,248 A *  1/1951   Lynch et al. .................. 228/158
(Continued)

FOREIGN PATENT DOCUMENTS

FR         1082571 A    12/1954

OTHER PUBLICATIONS

International Search Report mailed Mar. 7, 2014 (PCT/US2013/064219).

*Primary Examiner* — Erin Saad
(74) *Attorney, Agent, or Firm* — Robert L. Stearns; Dickinson Wright, PLLC

(57) ABSTRACT

A continuous hot bonding method for producing a bi-material strip with a strong bond therebetween is provided. The method comprises sanding a first strip formed of steel; and applying a layer of first particles, typically formed of copper, to the sanded first strip. The method next includes heating the first strip and the layer of the first particles, followed by pressing a second strip formed of an aluminum alloy onto the heated layer of the first particles. The aluminum alloy of the second strip includes tin particles, and the heat causes the second particles to liquefy and dissolve into the melted first particles. The first particles and the second particles bond together to form bond enhancing metal particles, which typically comprise bronze.

13 Claims, 1 Drawing Sheet

(51) Int. Cl.

| | | |
|---|---|---|
| B23K 37/00 | (2006.01) | |
| B22F 7/04 | (2006.01) | |
| B23K 20/227 | (2006.01) | |
| B32B 15/01 | (2006.01) | |
| F16C 33/14 | (2006.01) | |
| B23K 1/00 | (2006.01) | |
| B23K 1/19 | (2006.01) | |
| B21B 1/38 | (2006.01) | |
| B23K 20/04 | (2006.01) | |
| B22F 3/18 | (2006.01) | |
| C22C 21/00 | (2006.01) | |
| C22C 38/00 | (2006.01) | |
| B23K 35/30 | (2006.01) | |
| B23K 35/02 | (2006.01) | |
| F16C 33/12 | (2006.01) | |
| C22C 1/04 | (2006.01) | |

(52) U.S. Cl.
CPC ........ *B23K 20/2275* (2013.01); *B23K 35/0244* (2013.01); *B23K 35/302* (2013.01); *B23K 37/003* (2013.01); *B32B 15/012* (2013.01); *B32B 15/013* (2013.01); *B32B 15/015* (2013.01); *C22C 21/00* (2013.01); *C22C 38/00* (2013.01); *F16C 33/14* (2013.01); *B22F 2003/185* (2013.01); *B22F 2999/00* (2013.01); *B23K 2201/185* (2013.01); *B23K 2203/20* (2013.01); *C22C 1/0425* (2013.01); *F16C 33/122* (2013.01); *Y10T 428/12069* (2015.01)

(56) References Cited

U.S. PATENT DOCUMENTS

| | | | | |
|---|---|---|---|---|
| 2,735,170 | A | * | 2/1956 | Moffatt .................... 228/220 |
| 2,763,058 | A | | 9/1956 | McCullough et al. |
| 3,078,563 | A | | 2/1963 | Gould et al. |
| 3,350,494 | A | * | 10/1967 | Fomin et al. ............ 373/140 |
| 3,839,780 | A | | 10/1974 | Freedman et al. |
| 3,888,296 | A | | 6/1975 | Vernia et al. |
| 3,920,360 | A | | 11/1975 | Bierlein |
| 4,040,822 | A | * | 8/1977 | Stern ........................ 420/530 |
| 5,074,458 | A | | 12/1991 | Tanaka et al. |
| 5,083,697 | A | | 1/1992 | Difrancesco |
| 6,193,814 | B1 | | 2/2001 | Baldi |
| 2002/0084052 | A1 | * | 7/2002 | Crafton et al. ............... 164/5 |
| 2003/0207769 | A1 | * | 11/2003 | Whitney et al. ........... 508/103 |

\* cited by examiner

BI-MATERIAL STRIP AND A METHOD OF BONDING STRIPS OF DIFFERENT MATERIALS TOGETHER

CROSS REFERENCE TO RELATED APPLICATION

This U.S. utility patent application claims the benefit of U.S. Provisional Patent Application Ser. No. 61/712,016, filed Oct. 10, 2012, which is incorporated herein by reference in its entirety.

BACKGROUND OF THE INVENTION

1. Field of the Invention

The present invention is related to a bi-material strip including a strip of steel bonded to a strip of an aluminum alloy, and a method of forming such a bi-material strip.

2. Related Art

Bi-material strips including both a strip of an aluminum alloy and a strip of steel are typically used in, among other things, bearings, bushings and washers for various automotive and non-automotive applications. One method to form such bi-material strips is by heating the steel strip to a predetermined temperature, feeding both strips through a high-pressure roller which presses them against one another and finally by quenching the resulting bi-material strip.

SUMMARY OF THE INVENTION

One aspect of the invention provides a method of forming a bi-material strip. The method includes providing a first strip formed of steel; and applying a layer of first particles to the first strip. The first particles are formed primarily of at least one of copper, nickel, and magnesium. The method next includes heating the layer of the first particles applied to the first strip; and applying a second strip to the layer of the first particles. The second strip is formed of an aluminum alloy including second particles formed of tin.

Another aspect of the invention provides a bi-material strip. The bi-material strip includes a first strip formed of steel, and a second strip formed of an aluminum alloy bonded to the first strip. An intermediate layer including a plurality of bond enhancing metal particles bond the first strip to the second strip. The bond enhancing metal particles include first particles and second particles bonded together. The first particles are formed primarily of at least one of copper, nickel, magnesium, and alloys thereof; and the second particles are formed of tin.

The bond enhancing metal particles provide a strong bond between the first strip and the second strip. In addition, the bi-material strip can be formed very quickly, efficiently, and in high volumes at relatively low cost.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENTS

Figure 1:
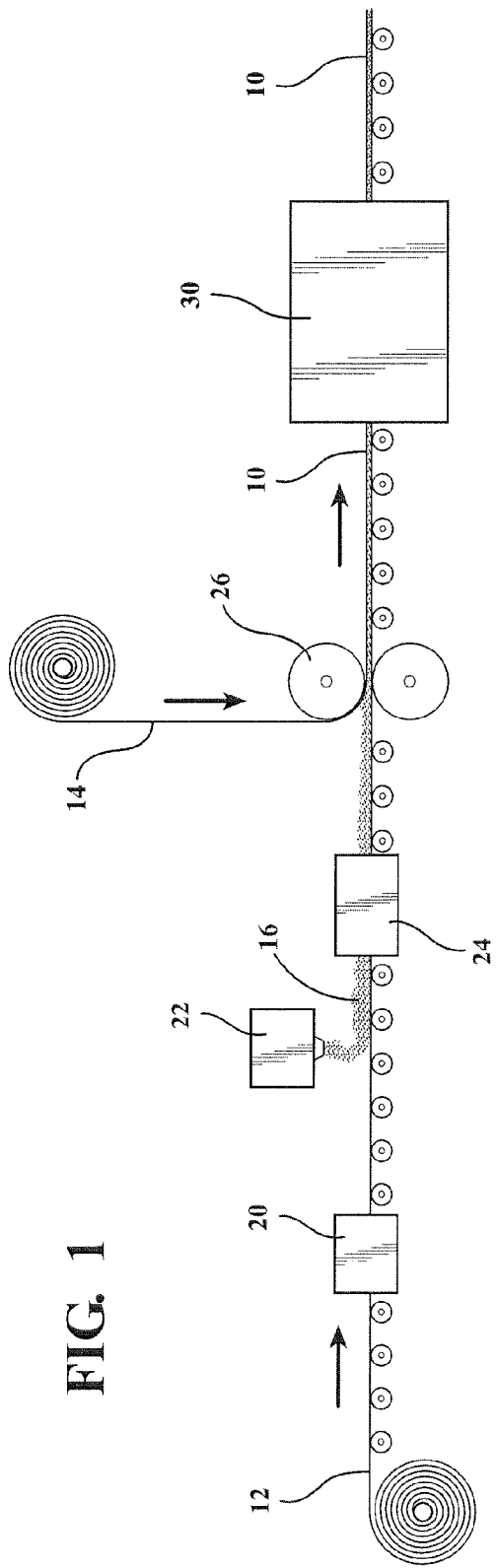
FIG. 1 illustrates a method of forming a bi-material strip according to one exemplary embodiment.

The invention provides a method of forming a bi-material strip 10 including a first strip 12 formed of steel and a second strip 14 formed of an aluminum alloy with a strong bond therebetween. The strong bond is provided by applying first particles 16 to the first strip 12 prior to hot bonding the strips 12, 14 together. The method typically includes a continuous process allowing the bi-material 10 strip to be formed quickly, efficiently, and in high volumes at relatively low cost. The resulting bi-material strip 10 may be used in a wide range of different automotive and non-automotive parts including, but not limited, to bearings, bushings or washers.

Figure 2:
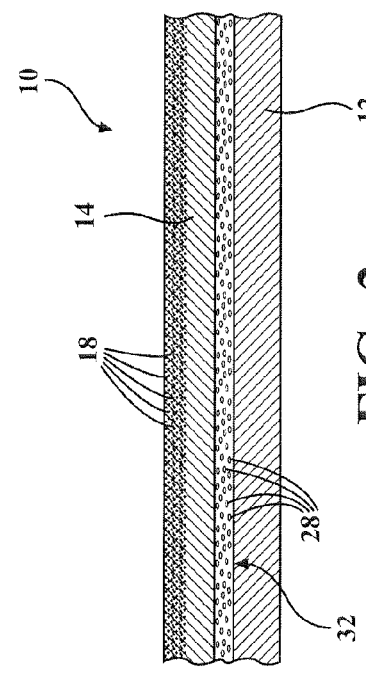
FIG. 2 is a cross-sectional view of the bi-material strip formed according to the method of FIG. 1.

FIG. 1 illustrates the method of forming the bi-material strip 10 according to one exemplary embodiment, which can be referred to generally as a hot bonding process. FIG. 2 illustrates the bi-material strip 10 according to one exemplary embodiment. The method includes providing the first strip 12 formed of steel, and providing the second strip 14 formed of the aluminum alloy. The steel can be any desirable type of steel, and the aluminum alloy can be any desirable type of aluminum alloy that includes second particles 18 formed of tin. In one preferred embodiment, the aluminum alloy is A-515, which is known to have a high tin content. The first strip 12 and the second strip 14 are typically fed continuously into the process, as shown in FIG. 1.

The method begins by cleaning the first strip 12 by continuously feeding the first strip 12 through a cleaning assembly 20 to remove contaminants therefrom. In one preferred embodiment, the cleaning assembly 20 is a sander and the cleaning step includes sanding an upper surface of the first strip 12.

The method next includes applying the first particles 16 to the sanded upper surface of the first strip 12. The first particles 16 are formed primarily of at least one of copper, nickel, and magnesium. For example, the first particles 16 can be formed of pure copper, nickel, or magnesium. Alternatively, the first particles 16 can be formed of alloys whose primary ingredient constituent is copper, nickel, or magnesium. In one preferred embodiment, the first particles 16 are formed of copper. The first particles 16 also preferably have a nominal size capable of providing localized stresses in the resulting bond between the strips 12, 14 to improve the resulting bond between the strips 12, 14. In one embodiment, the nominal particle size of the first particles 16 is approximately 0.05 millimeters.

The first particles 16 are typically applied to the upper surface of the first strip 12 until the first particles 16 form a layer having a thickness capable of providing the strong bond between the strips 12, 14. In one embodiment, the thickness of the layer is approximately 0.1 millimeters. However, it should be appreciated that depending on the desired characteristics of the final bond, the size of the first particles 16 and thickness of the layer applied onto the first strip 12 can be varied. Preferably, the step of applying the first particles 16 to the first strip 12 includes spreading the unheated first particles 16 over the upper surface using a spreading device 22. It should be appreciated that any desirable type of powder spreading device 22 could be employed.

Figure 3:
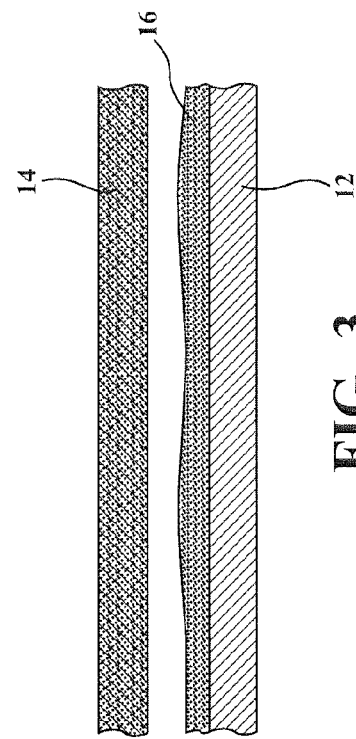
FIG. 3 is a cross-sectional view of a first strip with melted first particles after a heating step in the method of FIG. 1 and a second strip prior to bonding the second strip to the first strip.

Next, the method includes heating the first strip 12 with the layer of the first particles 16 to a predetermined temperature, wherein the predetermined temperature is high enough to at least partially melt the first particles 16 and the steel along the upper surface of the first strip 12. The heating step typically includes continuously feeding the first strip 12 through a heater 24, preferably an induction heater. However, it should be appreciated that any desirable type of heater 24 could be used. During the heating step, at least some of the first particles 16 melt and interact with the steel of the first strip 12. FIG. 3 is a cross-sectional view of the first strip 16 with the melted first particles 16 immediately after exiting the heater 24. FIG. 3 also shows the second strip 14 prior to the bonding step.

After the heating step, the method includes reducing the amount of oxides formed on the first particles 16 and on the upper surface of the first strip 12 during the prior steps. The reducing step includes continuously feeding and exposing the first strip 12 with the layer of the first particles 16 to a reducing atmosphere including hydrogen, such as an atmosphere consisting of pure hydrogen or a mixture of hydrogen and an inert gas such as nitrogen or argon.

While the first strip 12 and the first particles 16 are still hot or heated, the method includes pressing a lower surface of the second strip 14 onto the layer of the first particles 16 to form the bi-material strip 10. The pressing step preferably includes continuously feeding the first strip 14 and the second strip 14 through a high pressure roller 26, as shown in FIG. 1, such that the layer of the first particles 16 is sandwiched between the first strip 12 and the second strip 14. The roller 26 presses the strips 12, 14 against one another to form the bond between the strips 12, 14.

During the pressing step, heat from the first strip 12 and the melted first particles 16 is transferred to the second strip 14. Typically, the pressing step causes at least some of the second particles 18 along the lower surface of the second strip 14 to liquefy and dissolve into the melted first particles 16. The second particles 18 bond to the first particles 16 and form bond enhancing metal particles 28, which include both the first particles 16 and the second particles 18, between the strips 12, 14. Thus, the pressing step should be conducted while the first strip 12 and the first particles 16 are still at a temperature high enough to cause the second particles 18 along the lower surface of the second strip 14 to melt. When the first particles 16 include copper, the copper of the first particles 16 and the tin of the second particles 18 dissolve into each other, so the resulting bond enhancing metal particles 28 comprise bronze, which provides a strong bond between the first strip 12 and the second strip 14. Preferably, none of the second particles 18 formed of tin are present along the bond line at the lower surface of the second strip 14, as shown in FIG. 2, which is greatly exaggerated. The lack of tin along the bond line also contributes to the strong bond between the first strip 12 and the second strip 14. The bond enhancing particles 28 form an intermediate layer 32 bonding the first strip 12 to the second strip 14. The entire intermediate layer 32 can consist of the bond enhancing particles 28.

After bonding the first strip 12 to the second strip 14 to form the bi-material strip 10, the method includes cooling or quenching the bi-material strip 10 to a predetermined temperature. The cooling step typically includes continuously feeding the bi-material strip 10 from the roller 26 and through a quenching apparatus 30, for example a tank filled with a coolant, such as water, to quickly cool the bi-material strip 10 to the predetermined temperature. It should be appreciated that any desirable type of quenching apparatus 30 could be employed to carry out the quenching process including, for example, at least one sprayer. After the quenching process is complete, the bi-material strip 10 may be cut, bent, pressed or put through any desirable process to form any desirable type of part or work piece. For example, the bi-material strip 10 could be used as a sliding element, such as a bearing, bushing, or washer.

Another aspect of the invention provides the resulting bi-material strip 10 including the first strip 12 bonded to the second strip 14 by the intermediate layer 32 including the bond enhancing metal particles 28, as shown in FIG. 2. As stated above, the bond enhancing metal particles 28 include the first particles 16 bonded to the second particles 18, wherein the first particles 16 are formed primarily of at least one of copper, nickel, and magnesium; and the second particles 18 are formed of tin. The bond enhancing metal particles 28 are disposed on or along the upper surface of the first strip 12, and the upper surface preferably has irregularities formed by the sanding step. In one preferred embodiment, the first particles 16 are formed of copper and the bond enhancing particles 28 comprise bronze.

However, the properties of the resulting bond between the strips 12, 14 may depend at least partially on, among other things, the temperature that the first strip 12 and the layer of the first particles 16 are heated to by the heater 24; the pressure exerted by the roller 26; and the amount of time between the rolling and cooling steps. Accordingly, the temperature of the heater 24; the force applied by the roller 26; and the distance between the roller 26 and the quenching apparatus 30 may all be adjusted to adjust the properties of the resulting bond between the first and second strips 12, 14.

Obviously, many modifications and variations of the present invention are possible in light of the above teachings and may be practiced otherwise than as specifically described while within the scope of the appended claims.

The invention claimed is:

1. A method of forming a bi-material strip, comprising the steps of:
   providing a first strip formed of steel;
   applying a layer of first particles to the first strip, the first particles being formed primarily of copper;
   heating the layer of the first particles applied to the first strip;
   applying a second strip to the heated layer of the first particles, wherein the second strip is formed of an aluminum alloy including second particles formed of tin such that the tin of the second particles bonds to the copper of the first particles and forms bond enhancing particles of bronze between the first strip and the second strip.

2. The method of claim 1, wherein the step of applying the second strip to the layer of the first particles includes pressing a lower surface of the second strip onto the layer of the first particles while the layer of the first particles is hot.

3. The method of claim 2, wherein the pressing step includes dissolving the second particles into the first particles.

4. The method of claim 2, wherein the pressing step includes liquefying at least some of the second particles along the lower surface of the second strip.

5. The method of claim 2, wherein the pressing step includes feeding the first strip and the second strip through a roller such that the layer of the first particles is sandwiched between the first strip and the second strip.

6. The method of claim 1 including sanding an upper surface of the first strip prior to applying the layer of the first particles.

7. The method of claim 1, wherein the first particles have a particle size of 0.05 millimeters and the layer of the first particles has a thickness of 0.1 millimeters.

8. The method of claim 1, wherein the heating step includes interacting at least some of the first particles with the steel of the first strip.

9. The method of claim 1, wherein the heating step includes induction heating.

10. The method of claim 1 including exposing the layer of the first particles and the first strip to an atmosphere including hydrogen to reduce the amount of oxides formed on the first strip and on the first particles after the heating step and before applying the second strip to the layer of the first particles.

11. The method of claim 1 including using the bi-material strip in a bearing, bushing, or washer.

12. The method of claim 1 including feeding the bi-material strip through a quenching tank filled with a coolant after applying the second strip to the layer of the first particles.

13. A method of forming a bi-material strip, comprising the steps of:
providing a first strip formed of steel;
cleaning the first strip by feeding the first strip through a cleaning assembly to remove contaminants therefrom;
the cleaning step including sanding an upper surface of the first strip;
providing first particles having a nominal size of approximately 0.05 millimeters and formed primarily of copper;
applying the first particles to the upper surface of the first strip until the first particles form a layer having a thickness of approximately 0.1 millimeters;
the applying step including spreading the first particles over the upper surface of the first strip;
heating the first strip with the layer of the first particles to a predetermined temperature, wherein the predetermined temperature is high enough to at least partially melt the first particles and the steel along the upper surface of the first strip;
the heating step including feeding the first strip through an induction heater;
the heating step including interacting at least some of the first particles with the steel of the first strip;
reducing the amount of oxides formed on the first particles and on the upper surface of the first strip;
the reducing step including exposing the first strip with the layer of the first particles to an atmosphere including hydrogen;
providing a second strip formed of an aluminum alloy, the aluminum alloy including second particles formed of tin;
pressing a lower surface of the second strip onto the layer of the first particles on the first strip while the first strip and the first particles are still heated to form a bi-material strip;
the pressing step including feeding the first strip and the second strip through a roller such that the layer of the first particles is sandwiched between the first strip and the second strip;
the pressing step including liquefying at least some of the second particles along the lower surface of the second strip;
the pressing step including bonding the first particles to the second particles;
the bonding step including forming bond enhancing metal particles including bronze from the copper of the first particles and the tin of the second particles between the first strip and the second strip;
cooling the bi-material strip to a predetermined temperature; and
the cooling step including feeding the bi-material strip through a quenching tank filled with a coolant.

* * * * *